P. Merrick,
9030X
Wrench.
Patented Aug. 17, 1835.
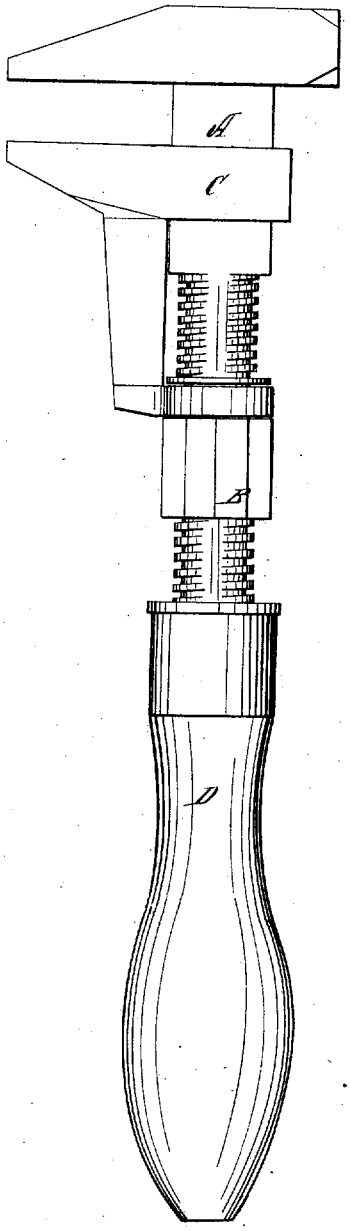
N. PETERS, PHOTO-LITHOGRAPHER, WASHINGTON, D. C.

Extended for 7 Years from 17 August 1849.

9030X Aug. 17, 1835

* Solyman Merrick. Springfield. Mass.

Letters Patent

Extended

The Schedule referred to in these Letters Patent and making part of the same containing a description in the words of the said Solyman Merrick himself of his improvement in the screw Wrench To all whom it may concern. Be it known that I Solyman Merrick of Springfield in the County of Hampden and State of Massachusetts have invented an improvement in the screw wrench, and I do hereby declare that the following is a full and exact description of my said improvement. The part of the main bar and slide which form the jaws of the wrench together with part of the main bar which passes through the wood handle, and the handle itself may be made in the same form and manner of the rack wrench invented by Henry King for which Letters Patent of the United States were granted to him on the 25th of Oct 1832. I make the form of the main bar upon which the slide passes an oblong square extending toward the handle a little farther than the jaws of the wrench are required to open. From this point I turn the bar to a diameter equal with the longest diameter of the oblong square, and of a length sufficient to receive a nut in addition to the distance required for the jaws to open. On this part of the bar I cut a double thread screw and fit a nut to it. I connect this nut to the slide jaw by means of a bar attached to the jaw which passes along the top of the main bar and extends a short distance over the screw. Underneath this bar and near the end I mill a circular groove. I also turn a groove in the outside of the nut which leaves a flanch or collar at the end. This collar takes into the circular groove in the bar and space between this groove and the end of the bar. I make to fit the groove in the nut. I make a ^strap to pass around in the groove of the nut and rivet firmly to the sides of the^ slide bar. The part of the nut which extends back from the groove I make an octagon that it may be the more readily turned round by the hand. It will be seen from this arrangement that by turning the nut the slide jaw may be set to any desired point on the bar. Although I

[* Re-issued. 17 May 1842.) Re-issued 2nd time 25 November 1851.]

have pointed out what I deem to be the best mode of arranging the parts so as to adjust the slide jaw by means of a screw I do not intend thereby to confine myself to this particular arrangement but to vary the same in any way which is in accordance with the general principles of the arrangement as herein before set forth limiting myself in my claim to improvement to the arrangement of the screw, the nut and the manner of attaching the nut to the slide jaw Exd. Witnesses Lyman Merrick.

Wf. William Bliss.

Charles A. Mann (Drawing)

(518 Words)

(Patented August 17, 1835)